May 20, 1924.
H. E. IVES
PHOTOMETER
Filed May 2, 1923
1,494,548
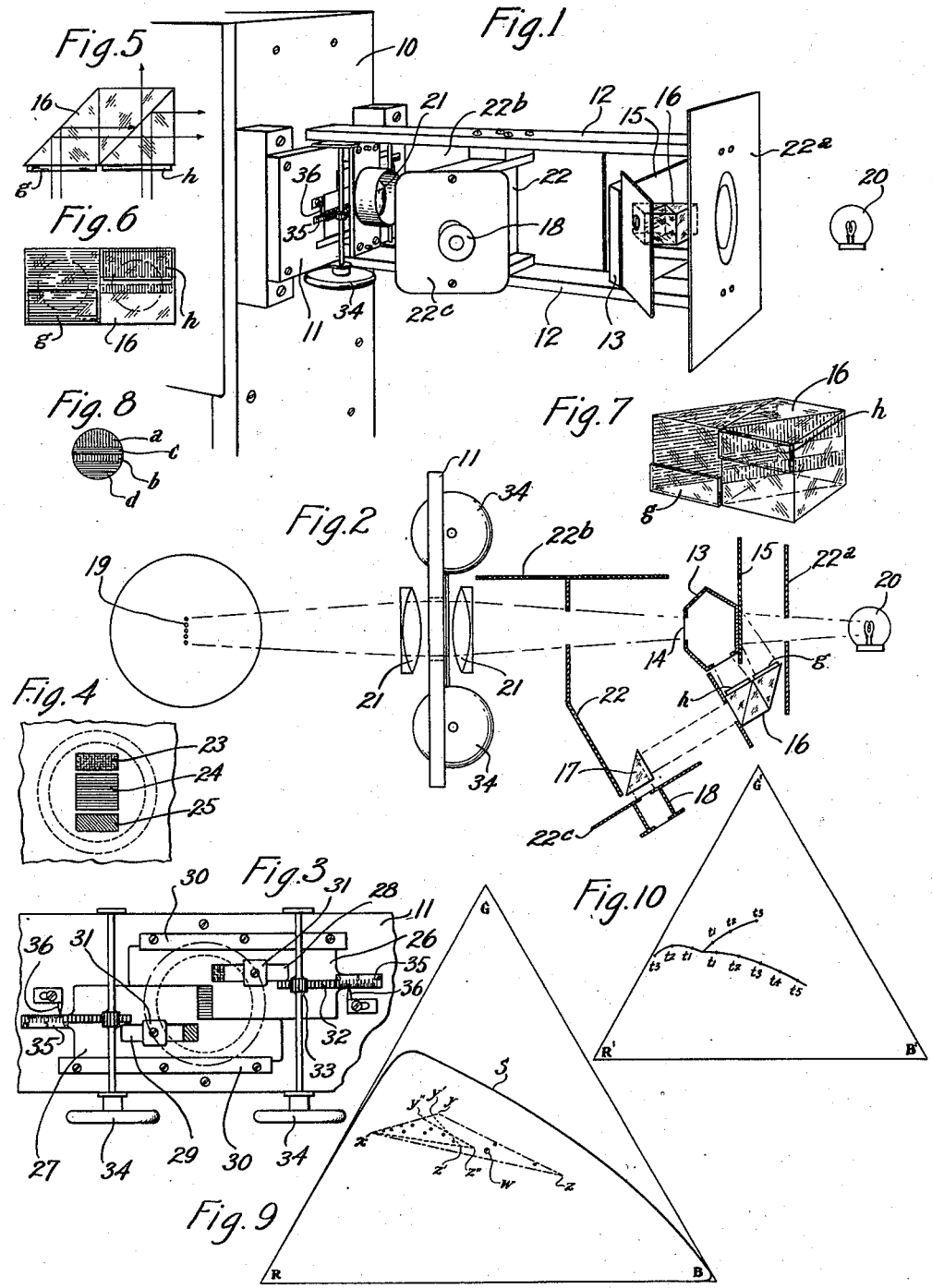
Inventor:
Herbert E. Ives.
by [signature] Att'y.

Patented May 20, 1924.

1,494,548

UNITED STATES PATENT OFFICE.

HERBERT E. IVES, OF MONTCLAIR, NEW JERSEY, ASSIGNOR TO WESTERN ELECTRIC COMPANY, INCORPORATED, OF NEW YORK, N. Y., A CORPORATION OF NEW YORK.

PHOTOMETER.

Application filed May 2, 1923. Serial No. 636,087.

*To all whom it may concern:*

Be it known that I, HERBERT E. IVES, a citizen of the United States, residing at Montclair, in the county of Essex, State of New Jersey, have invented certain new and useful Improvements in Photometers, of which the following is a full, clear, concise, and exact description.

This invention relates to photometry and has for its object the measurement of the relative luminous intensities of light sources which are different in color, in such a way that the difficulties ordinarily met in making such measurements are overcome.

To attain this object there is provided a comparison light source, a lens system to concentrate the light from this source upon one half of a photometric field, and a light filter comprising a series of colored apertures of variable areas in said lens system by means of which the color of the light reaching the photometric field from this source may be altered at will, and means for transmitting light from the light source to be measured to the other half of said photometric field. By varying the respective areas of the colored apertures, the light reaching the photometric field from the comparison light source may be made of the same color as the light emitted from the light source to be measured. Having obtained the color match between the said two sources of light, the relative intensities thereof are determined by photometric settings in the regular manner.

Referring now to the drawings, Fig. 1 is a perspective view of a photometer embodying the invention; Fig. 2 is a diagrammatic plan view thereof; Fig. 3 is a view of the filter; Fig. 4 is a detail of the filter; Figs. 5, 6 and 7 are details of the photometric prism; Fig. 8 discloses the photometric field as seen through the eye piece and Figs. 9 and 10 disclose color triangles.

The photometer comprises a box 10 in which is contained the comparison source of light. On one face of this box is provided a frame 11 comprising a support for the concentrating lens systems and the light filter to be hereinafter described. Projecting from the box is a pair of supports 12 between the outer ends of which is supported a hexagonal box 13 having white interior walls and provided with a ground glass window 14 in the wall facing the box 10. Also supported by the members 12 is an extended white surface 15 which is adapted to receive light from an illuminant to be measured. A photometric prism 16 is arranged to receive the light diffused from the interior of the box 13 through an aperture in the wall thereof and the surface 15 and reflect such light to the prism 17 which in turn reflects the light to the eye-piece 18. The prism 17 and the eye-piece 18 are also supported from the arms 12.

In Fig. 2, 19 represents the comparison light source within the box 10, 20 is the illuminant to be measured and 21 two plano-convex achromatic lenses on either side of the filter by means of which the image of the comparison source of light 19 is focused upon the ground glass window 14. Shields 22, 22ª, 22ᵇ and 22ᶜ are provided to protect the diffusing surfaces from light from some exterior source.

Referring now to Figs. 3 and 4, a plurality of colored glasses 23, 24 and 25 are arranged in apertures in the frame 11. Each one of these glasses is of the same length but the width of each is such that the luminous intensity of the light transmitted through each one is equal. Directly over the glasses are slidably mounted a pair of metal sheets 26 and 27. Each of these sheets comprises two portions, one of which is offset from the other, one portion of each sheet being arranged to act as a shutter for one of said apertures and the other portions of said sheets combining to form a shutter for the third aperture. The design of the sheets is such that relative movement thereof exposes varying ratios of the three glasses but the sum of the length of glass exposed always remains the same. For convenience of manufacture and manipulation, the sheets 26 and 27 are so shaped that for approximately half its length, each sheet is wider by the width of the glass 24 than its remaining portion and are arranged relative to each other so that each wider portion overlies the glass 24 with its edge in contact with the edge of the narrow portion of the other. In the sheet 26 is cut a slot 28 of sufficient size to expose the entire width of the glass 23 and having one end in alignment with the end of the wide portion of the slide and in the sheet 27 is cut a slot 29 of a sufficient size to expose the entire width of the glass 25, said slot having one end in alignment with the end of the wide portion of the sheet 27. The sheets are slidably held on the frame by means of the guides 30 overlying the outer edges of the sheets and the guides 31 projecting through the slots 28 and 29 and overlying the sheets 26 and 27. The slides 26 and 27 are movable between and away from each other through the medium of the rack and pinion 32 and 33 respectively, the pinion being rotatable through the medium of the wheels 34. Adjustment of the slides 26 and 27 allows varying amounts of different colors to be transmitted through the filter without affecting the total luminous intensity of the transmitted light, since, as above described, each aperture is of the same luminosity for an equal length. Each of the slides 26 and 27 is provided with a scale 35 and a pointer 36 is arranged on the frame 11 to cooperate with each scale whereby may be determined the relative amounts of each glass exposed.

The prism 16 is of an ordinary photometric type and arranges the light fields from the sources 19 and 20 in juxta-position so that when viewed through the eye-piece 18, the field from the source 19 comprises a pair of bands of light $a$ and $b$ and the light from the source 20 comprises a pair of bands $c$ and $d$ as shown in Fig. 8. The face of the prism 16 is provided with strips of glass $g$ and $h$ so arranged that they render the bands $a$ and $d$ of less intensity than the bands $c$ and $b$ according to the well known contrast principle.

To determine the intensity of an illuminant such as 20, it is positioned as shown diagrammatically in Fig. 2 so that the light emitted therefrom illuminates one half of the photometric field as seen through the eye-piece 18, the source 19 supplying the light for the other half of the field. The color of the light transmitted from the source 19 to the photometric field is varied by adjusting the amounts of different colors transmitted through the glasses 23, 24 and 25 by manipulating the slides 26 and 27 until a match is obtained between the colors of the light transmitted from the two sources. After a color match has been obtained, the two sources of illumination are matched for intensity by making the usual photometric settings and the relative intensities determined in the manner common to photometry.

The comparison lamp must, of course, be operated at a definite color. This can be provided for by moving the filter out of the system and comparing the emitted light with some color standard light. The comparison lamp is adjusted by varying the energy supplied thereto until it matches the color standard. In the construction of the embodiment of this invention, a high efficiency tungsten lamp matching a black body heated to the temperature of 2848° absolute has been found to be very satisfactory for use as the comparison lamp.

In order to determine the three primary colors to be used for the glasses 23, 24 and 25, use is made of the fundamental reference color triangle R. G. B. of Fig. 9. This triangle is of the "unit-sensation-sum" type discussed in the January, 1923, issue of the Journal of the Franklin Institute in an article entitled "The Transformation of Color Mixture Equations from One System to Another II, Graphical Aids" by H. E. Ives, and its vertices represent the fundamental color sensations, red, green and blue, respectively. In this color triangle, are plotted, in accordance with the disclosure in the aforementioned article, the spectrum S as a curve of wave lengths, and a series of illuminants $i$ in the measurement of which the device is designed to be used. From this plot are determinable smaller triangles such as $x$, $y$, $z$, $x$, $y'$, $z'$ and $x$, $y''$, $z''$ where vertices represent colors where mixtures well match all the colors lying within the triangles in question.

Upon describing a triangle which includes all the colors which a particular device may be called upon to measure, the primary colors which will just suffice to form matches for the colors it is desired to measure are given by the triangles' vertices. Depending upon the purities of the colors to be measured these primaries may range from moderately saturated colors to colors slightly more than tints. The approximate color of each primary is determined by inspection from the spectrum curve by locating the point on the spectrum curve between which and the midpoint of the triangle R. G. B. representing white light, the primary in question is located.

Samples of glass having the approximate color desired are measured on a spectro-photometer. Taking the transmission curves for the samples and multiplying the energy distribution of the comparison lamp above described at each wave length by the transmission values, a set of energy curves is obtainable corresponding to various thicknesses of the glass. These energy curves are multiplied at each wave length by the color sensations of the equal energy spectrum. The resultant sensation values for the various colors so obtained are plotted as $t^1$, $t^2$, $t^3$, etc. in the color triangle R', B', G' of Fig. 10 which is similar to the color triangle R. G. B of Fig. 9. By comparison of these two triangles, thicknesses are selected for which the sensation value corresponds to the desired primaries of one of the smaller triangles of Fig. 9. Such thicknesses of glass will provide colors of which mixtures will match all of the illuminants contained in the triangle of which they are the primaries. The method of obtaining the sensation values for the various colors plotted in the color triangle of Fig. 10 is discussed at length in the above mentioned article by Mr. H. E. Ives.

The above described process of selecting three colors for the apertures of the filter overcomes the very serious practical difficulty usually presented in measuring light by the use of a three-color mixture instrument that measurements made by different observers are apt to differ quite widely. The chief reason for this is that the red, green and blue primaries which would ordinarily be used are quite narrow bands of the spectrum, while the colors which it is desired to measure, for example, those of the illuminants are of quite different spectral character consisting of continuous spectra of slowly changing intensity from one length to another. As a consequence, the relative proportions of the primaries which constitute a match for some illuminant with one observer do not do so for another. However, with primaries chosen as above described so that their triangle just encloses the illuminants to be measured, the light formed by their mixture is in every case a close approximation of a smooth continuous spectrum, matching very closely in spectral composition the continuous spectra of the chief practical illuminants which lie within the triangle.

This device may also be utilized as a colorimeter. By means of the scales 30 on the slides 24 and 25, it is possible to determine the relative amounts of colors needed to match the color of an illuminant being measured. These quantities constitute a measurement of the color of the illuminant in that trichromatic system whose primaries are the colors used in the filter. These values can be plotted in a color triangle and will constitute a complete record of the color measured.

The invention claimed is:

1. In a photometer, a light source, a lens system to concentrate the light from said source upon one-half of a photometric field, and a series of colored apertures of variable size in said lens system whereby the color of the light reaching the photometric field may be altered at will.

2. In a photometer, a light source, a lens system to concentrate the light from said source upon one-half of a photometric field, and a series of colored apertures of variable size in said lens system whereby the color of the light reaching the photometric field may be altered at will, the variable apertures being so related to their size controlling means that the total luminous value of the transmitted light remains constant as the relative amounts of the different colors are changed.

3. In a photometer, a light source, a lens system to concentrate the light from said source upon one-half of a photometric field, a series of colored apertures in said lens system, and means for varying the effective area of each of said apertures to vary the color of the light reaching the photometric field and maintaining constant the total luminous value of the transmitted light.

4. In a photometer, a light source, a lens system to concentrate the light from said source upon one-half of a photometric field, a series of colored apertures of equal length in said lens system, the relative areas of said glasses being such that light transmitted therethrough is of equal luminous value, and means for varying the effective area of said apertures and maintaining constant the total effective length thereof.

5. In a photometer, a light source, a lens system to concentrate the light from said source upon one-half of a photometric field, a series of colored apertures in said lens system, means for varying the effective area of said colored apertures whereby the color of the light reaching the photometric field may be altered at will, and means for so proportioning the effective areas of said apertures that the total luminous value of the transmitted light remains constant.

6. In a photometer, a light source, a lens system to concentrate the light from said source upon one-half of a photometric field, a series of colored apertures in said lens system, the width of said apertures being inversely proportional to the luminosity of light transmitted therethrough, and means for exposing varying lengths of said apertures and maintaining constant the total length of the exposed portions.

7. In a photometer, a light source, a lens system to concentrate the light from said source upon one-half of a photometric field, three aligned colored apertures in said system, the width of said apertures being inversely proportional to the luminosity of light transmitted therethrough, a pair of shutters overlying said apertures, each of said shutters consisting of two offset portions, one portion of each shutter overlying an aperture and the remaining portion of each shutter overlying the remaining aperture, and means to reciprocate said shutters for exposed various lengths of each of said shutters and maintaining constant the total length of the exposed portions.

8. In a photometer, a light source, a lens system to concentrate the light from said source upon one-half of a photometric field, three colored apertures in said system, a pair of shutters overlying said apertures and so arranged that the reciprocation thereof will vary the effective area of said colored apertures whereby the color of the transmitted light may be varied without variation in its total luminous value, and means for reciprocating said shutters.

9. In a photometer, a light filter comprising three colored apertures, and a pair of slides, each slide comprising two portions offset from each other, one portion of each slide being arranged to act as a shutter for one of said apertures and the remaining portions of said sheets combining to form a shutter for the third aperture.

10. In a photometer, a light filter comprising three colored apertures, and a pair of members slidably mounted over said apertures, each member comprising a pair of offset portions, each of said portions being arranged to act as a shutter for one of said apertures.

11. In a photometer, a light filter comprising three colored apertures, and a pair of members slidably mounted over said apertures, each of said members comprising a portion equal in width to one of said apertures and adapted to act as a shutter therefor and a second portion offset from said first portion, and adapted to act as a shutter for another of said apertures.

12. In a photometer, a light filter comprising three colored apertures, and a pair of members slidably mounted over said apertures, each of said members comprising two offset portions, the corresponding offset portions of said members being in contact with each other.

13. In a photometer, a light filter comprising three aligned colored apertures, a pair of slidable members overlying said apertures, each of said slides having a portion wider than the remainder thereof by the width of the intermediate aperture extending across the intermediate aperture, a slot in each of said slides at least equal in width to the aperture which it overlies and a guide member projecting through each of said slots.

14. In a photometer, a light filter comprising three aligned colored apertures, a pair of slidable members overlying said apertures, each of said slides having a portion wider than the remainder thereof by the width of the intermediate aperture extending across the intermediate aperture, a slot in each of said slides at least equal in width to the aperture which it overlies, a guide member projecting through each of said slots, and means for reciprocating said slidable members.

15. In a photometer, a light filter comprising three colored apertures, a pair of slides overlying said apertures, each slide having a portion wider than the remainder by an amount equal to the width of one of said apertures extending thereacross said slides having their wide and narrow portions respectively in contact, and an aperture in each of said slides in alignment with one of the remaining colored apertures.

16. In a photometer, a light filter comprising three aligned colored apertures, a pair of slides overlying said apertures, each of said slides having a portion wider than the remainder thereof by the width of the intermediate aperture extending across said intermediate aperture, and a slot in each of said slides of a width equal to the aperture which said slide overlies.

17. A light filter comprising three colored apertures, a pair of shields overlying said apertures, each of said shields extending over one of said apertures and having a portion extending over the third of said apertures, a slot in each of said slides to expose the aperture underlying it, and means to reciprocate said slides whereby the effective area of each of said apertures is varied but the combined length thereof is maintained constant.

18. A light filter comprising three colored apertures, and a pair of shields overlying said apertures, each of said shields overlying one of said apertures and having a portion overlying the third of said apertures.

In witness whereof, I hereunto subscribe my name this 1st day of May A. D., 1923.

HERBERT E. IVES.